(12) United States Patent
Soo et al.

(10) Patent No.: US 8,022,931 B2
(45) Date of Patent: Sep. 20, 2011

(54) SELF-CALIBRATING OPTICAL FEEDBACK SYSTEM IN A LASER MOUSE

(75) Inventors: Kee Seng Soo, Kuala Lumpur (MY); Yat Kheng Leong, Selangor (MY); Sai Mun Lee, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 900 days.

(21) Appl. No.: 11/947,592

(22) Filed: Nov. 29, 2007

(65) Prior Publication Data

US 2009/0140984 A1 Jun. 4, 2009

(51) Int. Cl.
*G09G 5/08* (2006.01)
(52) U.S. Cl. .......... 345/166; 345/156; 356/499
(58) Field of Classification Search ......... 345/156–166
See application file for complete search history.

(56) References Cited

U.S. PATENT DOCUMENTS

| | | | |
|---|---|---|---|
| 2005/0094154 A1* | 5/2005 | Baney et al. | 356/499 |
| 2005/0134556 A1* | 6/2005 | VanWiggeren et al. | 345/156 |
| 2005/0180473 A1 | 8/2005 | Brosnan | |
| 2006/0187434 A1* | 8/2006 | Sogard | 355/55 |
| 2006/0202962 A1* | 9/2006 | Lai et al. | 345/166 |
| 2007/0131842 A1* | 6/2007 | Ernst | 250/205 |
| 2008/0150897 A1* | 6/2008 | Lin | 345/166 |
| 2009/0016201 A1* | 1/2009 | Kondo et al. | 369/124.04 |
| 2009/0153950 A1* | 6/2009 | Kong et al. | 359/334 |

* cited by examiner

*Primary Examiner* — Amare Mengistu
*Assistant Examiner* — Premal Patel (57) ABSTRACT

A self-calibrating optical feedback system for an optical navigation device. The self-calibrating optical feedback system includes a light source, an illumination lens, a beam splitter, and an optical feedback device. The illumination lens is coupled relative to the light source. The light source emits light based on a programming current. The illumination lens directs the light towards a beam splitter. The beam splitter partially reflects the light directed from the illumination lens. The optical feedback device detects the partially reflected light from the beam splitter and generates a feedback signal to modify an intensity of the light emitted by the light source. Embodiments of the self-calibrating optical feedback system maintain the output intensity of a laser driven optical navigation device below an eye-safety level.

20 Claims, 6 Drawing Sheets

FIG. 1

PRIOR ART

SELF-CALIBRATING OPTICAL FEEDBACK SYSTEM IN A LASER MOUSE

BACKGROUND OF THE INVENTION

Conventional optical navigation devices, such as an optical mouse device for a computer, use a light emitting diode (LED) as an illumination source. More recently, a coherent light source, such as a vertical cavity surface emitting laser (VCSEL), is used as the illumination source to increase tracking sensitivity. A laser-based optical navigation device is able to reflect more detail from minor surface defects and textures on tracking surfaces than LED-based optical navigation devices. Using a laser optical navigation device can result in significantly increased tracking sensitivity compared to typical LED optical navigation devices.

Figure 1:
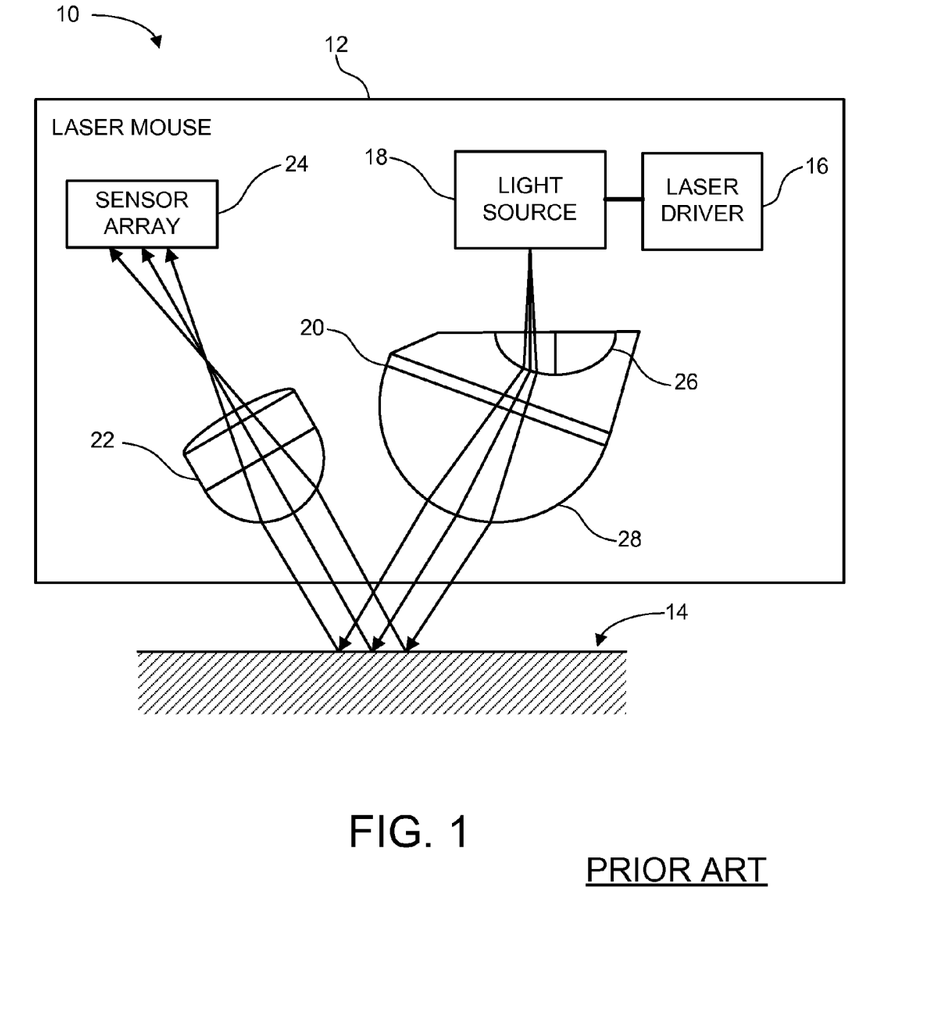
FIG. 1 depicts a conventional optical tracking system.

FIG. 1 depicts a conventional optical tracking system 10. The conventional optical tracking system 10 includes a laser mouse 12 and a tracking surface 14. The laser mouse 12 includes a laser driver 16, a light source 18, an illumination lens 20, an imaging lens 22, and a sensor array 24. The laser driver 16 generates a fixed output current or a variable output current to drive the light source 18. The variable output current can be adjusted via mechanical adjustments. The illumination lens 20 directs the emitted light towards the tracking surface 14. The imaging lens 22 directs the light reflected off the tracking surface towards the sensor array 24. The sensor array 24 detects the light directed through the imaging lens 22. By capturing a plurality of images of the illuminated tracking surface 14, the captured images are processed and examined to determine movement of the laser mouse 12 relative to the tracking surface 14.

Typically, a coherent light source is biased at some predetermined drive current level to achieve a desired light output level, or output beam power, offering optimum tracking sensitivity. Conventional laser drivers are designed with a fixed resistor or mechanical POT (potentiometer) to control the level of bias current supplied to the coherent light source. To a certain point, as the output beam power increases, so does the tracking sensitivity. However, using a laser in an optical navigation device poses hazards with respect to damage to vision.

The possibility for vision damage is made more uncertain, and potentially more dangerous, by the effects of external influences which may alter the laser output characteristics, in addition to the inherent minor differences in the characteristics of individual coherent light sources. Thus, coherent light sources emit light beams of different output beam power, even when the same current value is driving each coherent light source, making it difficult to ensure operation of lasers below a common eye-safety threshold.

SUMMARY OF THE INVENTION

Embodiments of a system are described. In one embodiment, the system is a self-calibrating optical feedback system. The self-calibrating optical feedback system includes a light source, an illumination lens, a beam splitter, and an optical feedback device. The illumination lens is coupled relative to the light source. The light source is configured to emit light based on a programming current. The illumination lens is configured to direct the light towards a beam splitter. The beam splitter is configured to partially reflect the light directed from the illumination lens. The optical feedback device is configured to detect the partially reflected light from the beam splitter and to generate a feedback signal to modify an intensity of the light emitted by the light source. Other embodiments of the system are also described.

Embodiments of an apparatus are also described. The apparatus includes means for emitting coherent light. The apparatus also includes means for splitting the coherent light to produce a reflected beam and tracking beam, means for detecting an intensity of the reflected beam, and means for controlling an intensity of the coherent light below an eye-safety level based on the detected intensity of the reflected beam. Other embodiments of the apparatus are also described.

Embodiments of a method are also described. In one embodiment, the method is a self-calibrating optical feedback method for operating a self-calibrating optical feedback system. The self-calibrating optical feedback method includes emitting light from a light source and splitting the light from the light source to reflect a portion of the light away from a tracking surface and to pass a remainder of the light towards the tracking surface. The self-calibrating optical feedback method also includes detecting the light reflected away from the tracking surface and adjusting an output intensity of the light source based on the detected light. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 2:
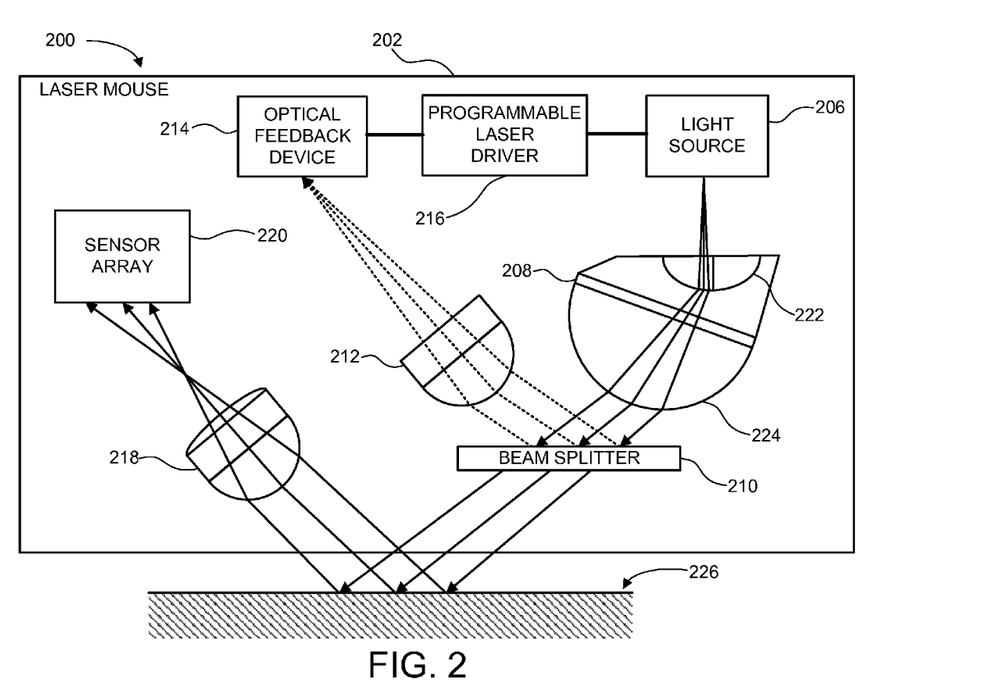
FIG. 2 depicts a schematic block diagram of one embodiment of an optical tracking system with a self-calibrating optical feedback system.

FIG. 2 depicts a schematic block diagram of one embodiment of an optical tracking system 200 with a self-calibrating optical feedback system. The illustrated optical tracking system 200 includes a laser mouse 202, and a tracking surface 226. Although certain component parts are shown in conjunction with the optical tracking system 200 of FIG. 2, other embodiments may include fewer or more component parts, or equivalent parts to perform fewer or more tracking and feedback functions.

The depicted laser mouse 202 includes a light source 206, an illumination lens 208, a beam splitter 210, a converging lens 212, an optical feedback device 214, a programmable laser driver 216, an imaging lens 218, and a sensor array 220.

The light source 206 emits a light towards the illumination lens 208. In one embodiment, the light source 206 is a light emitting diode (LED). In another embodiment, the light source 206 is a laser. Alternatively, the light source 206 may be another type of light source.

In one embodiment, the illumination lens 208 directs the emitted light from the light source 206 towards the beam splitter 210. The depicted illumination lens 208 includes an input surface 222 and an output surface 224. In one embodiment the input surface 222 directs the emitted light from the light source 206 towards the output surface 224, and the output surface 224 shapes and resizes the emitted light, directing the emitted light towards the beam splitter 210.

In the illustrated embodiment, the beam splitter 210 is interposed between the illumination lens 208 and the tracking surface 226 and oriented parallel to the tracking surface 226. In this embodiment, the beam splitter 210 partially reflects the light directed from the illumination lens 208 towards the converging lens 212, and directs a remainder of the light towards the tracking surface 226, illuminating the tracking surface 226 at a particular incident angle. In one embodiment, the beam splitter 210 is a thin semi-reflective plate, such as a half-silvered, pellicle, or dielectric optical coated mirror. In another embodiment, the beam splitter 210 is two attached triangular glass prisms. In a further embodiment the beam splitter 210 is a dichroic mirrored prism. Alternatively, the beam splitter 210 may be another type of beam splitter 210.

In the illustrated embodiment, the converging lens 212 is interposed between the beam splitter 210 and the optical feedback device 214. In this embodiment, the converging lens 212 receives the partially reflected light from the beam splitter 210 and directs the partially reflected light towards the optical feedback device 214.

In one embodiment, the optical feedback device 214 detects the partially reflected light from the beam splitter 210 and generates a feedback signal in order to modify an intensity of the light emitted by the light source 206. In one embodiment, the feedback signal is a programming current, and the optical feedback device 214 sends the programming current to the programmable laser driver 216. In a further embodiment, in response to a determination that the intensity of the light emitted by the light source 206 exceeds a threshold corresponding to an eye-safety level, the optical feedback device 214 automatically adjusts the programming current sent to the programmable laser driver 216.

In the illustrated embodiment, the programmable laser driver 216 converts the programming current from a digital programming current to an analog programming current. In this embodiment, the programmable laser driver 216 drives the light source 206 with the analog programming current. In one embodiment, the programmable laser driver 216 is a discrete component circuit, and the analog programming current is controlled by a voltage output digital-to-analog converter (DAC), coupled with a series resistor, such that the current drawn across the resistor is the analog programming current. In another embodiment, the programmable laser driver 216 is a laser driver integrated circuit (IC), and the analog programming current is controlled by a voltage output digital-to-analog converter (DAC), coupled with a series resistor, such that the current drawn across the resistor is the analog programming current. Alternatively, the programmable laser driver 216 may be another type of laser driver.

In one embodiment, the imaging lens 218 directs the light reflected off the tracking surface 226 towards the sensor array 220. The sensor array 220, oriented at a plane above the tracking surface 226, then detects the light directed through the imaging lens 218. In one embodiment, the sensor array 220 is a photosensor or other photosensitive device. In another embodiment, the sensor array 220 captures a plurality of images of the illuminated tracking surface 226 at a predetermined image-capture rate. The sensor array 220 may then send the captured images to be processed and examined by a digital signal processor (refer to FIG. 4) in order to determine coordinate movement of the laser mouse 202 and corresponding coordinate cursor movement on a computer monitor.

Figure 3:
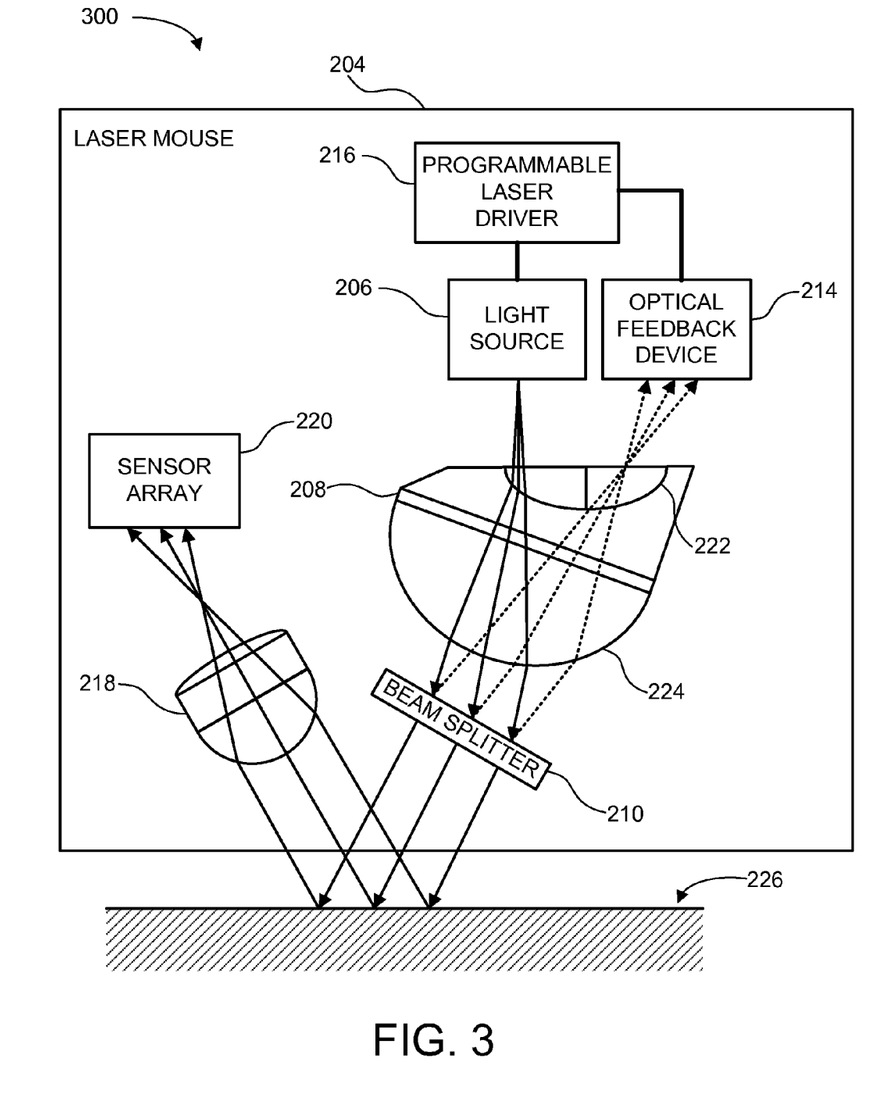
FIG. 3 depicts a schematic block diagram of another embodiment of an optical tracking system with a self-calibrating optical feedback system.

FIG. 3 depicts a schematic block diagram of another embodiment of an optical tracking system 10 with a self-calibrating optical feedback system. The illustrated optical tracking system 300 includes a laser mouse 204, and a tracking surface 226, as described in FIG. 2. Although certain component parts are shown in conjunction with the optical tracking system 300 of FIG. 3, other embodiments may include fewer or more component parts, or equivalent parts to perform fewer or more tracking and feedback functions.

The illustrated optical tracking system 300 of FIG. 3 includes many of the same or similar components as the optical tracking system 200 of FIG. 2. These components are configured to operate in substantially the same manner described above, except as noted below.

The depicted laser mouse 204 includes a light source 206, an illumination lens 208, a beam splitter 210, an optical feedback device 214, a programmable laser driver 216, an imaging lens 218, and a sensor array 220.

As described above, the illumination lens 208 directs the emitted light from the light source 206 towards the beam splitter 210, which is interposed between the illumination lens 208 and the tracking surface 226. However, in contrast to the orientation of the beam splitter in FIG. 2, the beam splitter of FIG. 3 is oriented at a non-zero angle relative to the tracking surface 226. In this embodiment, the beam splitter 210 reflects the partially reflected light back towards the illumination lens 208, which directs the partially reflected light towards the optical feedback device 214. The remainder of the light passes through the beam splitter 210 towards the tracking surface 226. In other words, the illustrated embodiment uses the illumination lens 208 to direct light in at least two directions—the light emitted from the light source 206 is directed in one direction through the illumination lens 208 towards the beam splitter 210, and the partially reflected light from the beam splitter 210 is directed in approximately the opposite direction through the illumination lens 208 towards the optical feedback device 214. The optical feedback device 214 operates to control the programmable laser driver 216 and, hence, the light source 206, as described above.

Figure 4:
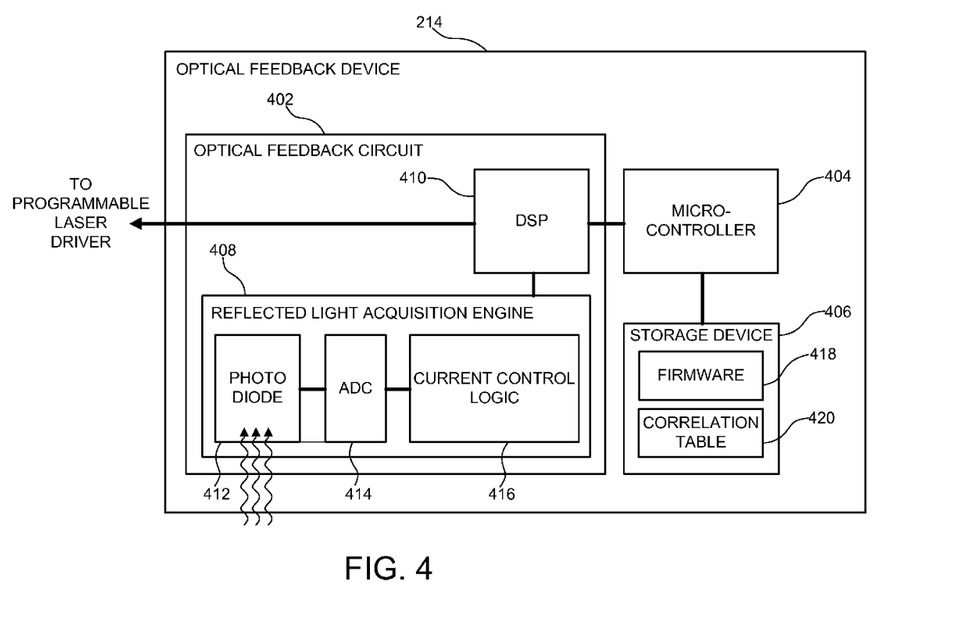
FIG. 4 depicts a schematic block diagram of one embodiment of an optical feedback device for use in a self-calibrating optical feedback system.

FIG. 4 depicts a schematic block diagram of one embodiment of an optical feedback device 214 for use in a self-calibrating optical feedback system. The illustrated optical device 214 includes an optical feedback circuit 402, a microcontroller 404, and a storage device 406. Although certain component parts are shown in conjunction with the optical feedback device 214 of FIG. 4, other embodiments may include fewer or more component parts, or equivalent parts to perform fewer or more feedback functions.

The depicted optical feedback circuit 402 includes a reflected light acquisition engine 408 and a digital signal processor (DSP) 410. Other embodiments may include fewer or more components. The partially reflected light from the beam splitter 210 is received through the converging lens 212 (refer to FIG. 3) or the illumination lens 208 (refer to FIG. 4) and detected by the reflected light acquisition engine 408. The depicted reflected light acquisition engine 408 includes a photodiode 412, an analog-to-digital converter (ADC) 414, and a current control logic 416.

In one embodiment, the photodiode 412 receives the partially reflected light from the beam splitter 210. The photodiode 412 converts the received partially reflected light to a photocurrent indicative of a beam power of the partially reflected light. The photodiode 412 then transmits the photocurrent to the analog-to-digital converter 414, which converts the photocurrent from an analog signal to a digital signal and then passes the digital signal to the current control logic 416.

In one embodiment, the current control logic 416 measures the converted photocurrent and calculates a beam power based on the converted photocurrent. The current control logic 416 then determines whether the beam power exceeds a threshold corresponding to an eye-safety level of the light emitted from the light source 206.

After the digital signal processor 410 receives the digital form of the reconfigured electrical signal from the analog-to-digital converter 414 of the reflected light acquisition engine 408, the digital signal processor 410 may perform additional processing using the reconfigured electrical signal. Thus, the digital signal processor may process a digital electrical signal representative of the partially reflected light and generate a feedback signal (e.g., a programming current) in response to the beam power of the partially reflected light exceeding the threshold. The digital signal processor 410 then transmits the programming current to the programmable laser driver 216, which controls an intensity of the light emitted from the light source 206 to control the intensity below the threshold corresponding to the eye-safety level.

It should be noted that, in the case where the current control logic 416 measures the converted photocurrent, calculates the beam power based on the converted photocurrent, and determines the beam power does not exceed a threshold corresponding to an eye-safety level, the digital signal processor 410 may send a programming current to the programmable current driver 216, to increase the intensity of the light signal emitted from the light source 206. So long as a new adjusted intensity of the emitted light does not exceed the threshold, the intensity of the emitted light may be increased. Thus, an optimal tracking sensitivity may be dynamically maintained in conjunction with dynamically maintaining the eye-safety level of the emitted light.

In one embodiment, the microcontroller 404 controls the self-calibrating feedback process. In another embodiment, the microcontroller 404 sends signals (e.g., a control signal) to the digital signal processor 410. In this embodiment, the microcontroller 404 also receives signals (e.g., a memory access signal) from the digital signal processor 410. Other embodiments of the microcontroller 404 may transmit and receive other types of signals to and from the digital signal processor 410. In one embodiment, the microcontroller 404 implements a variety of functions, including transmitting data to and receiving data from a host computer system (not shown).

The depicted storage device 406 includes firmware 418 and a correlation table 420. Other embodiments may include fewer or more storage components. In one embodiment, the storage device 406 stores a default programming current, whereby the programmable laser driver 216 initially drives the light source 206 with the default programming current.

In one embodiment, the firmware 418 performs operations of the self-calibrating optical feedback process. In another embodiment, parts of the current control logic 416 may be implemented in the firmware 418. In a further embodiment, a value of the threshold corresponding to the eye-safety level of the light emitted from the light source 206 is adjusted and set via the firmware 418.

In one embodiment, the correlation table 420 stores a list that correlates a detected intensity of the partially reflected light with the intensity of the light emitted from the light source 206. In another embodiment, the value of the threshold corresponding to an eye-safety level of the light emitted from the light source 206 is stored in the correlation table 420. Other embodiments may include fewer or more values stored in the correlation table 420.

Figure 5:
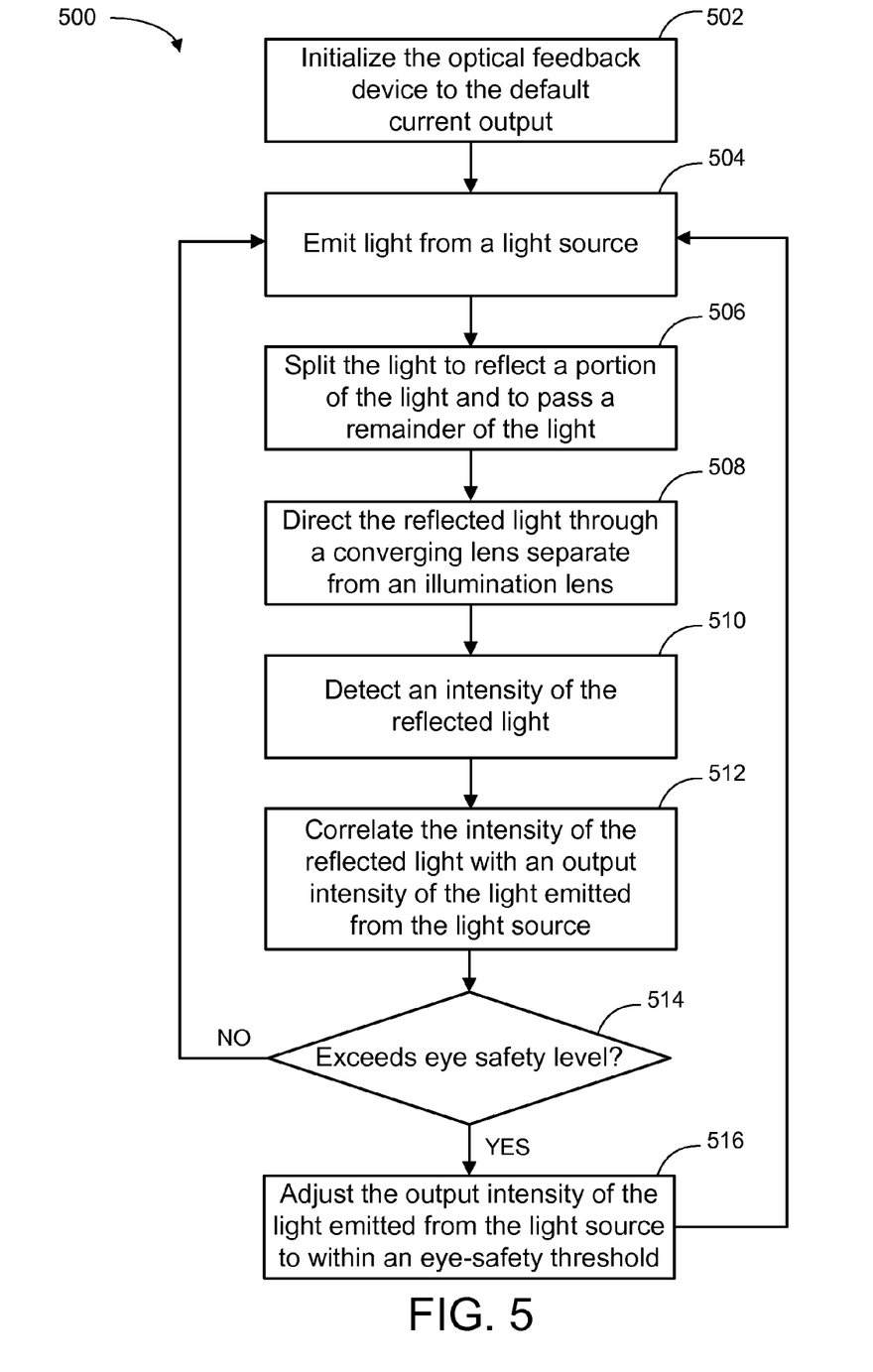
FIG. 5 depicts a schematic flow chart diagram of one embodiment of a self-calibrating optical feedback method for an optical tracking system.

FIG. 5 depicts a schematic flow chart diagram of one embodiment of a self-calibrating optical feedback method 500 for an optical tracking system 200. Although the self-calibrating optical feedback method 500 is described in conjunction with the optical tracking system 200 of FIG. 2, some embodiments of the method 500 may be implemented with other types of optical tracking devices.

At block 502, the optical tracking system 200 initializes the optical feedback device 214 to the default current output. In one embodiment, the programmable laser driver 216 drives the light source 206 with a default programming current that is stored in the storage device 406. At block 504, the optical tracking system 200 emits a light signal from a light source 206 based on the level of the programming current. In some embodiments, the light emitted from the light source 206 is a coherent light.

At block 506, the optical tracking system 200 splits the light emitted from the light source 206 to reflect a portion of the light away from a tracking surface 226 and to pass a remainder of the light signal towards the tracking surface 226. In one embodiment, a beam splitter 210 is oriented parallel to the tracking surface 226 to direct the partially reflected light signal towards a converging lens 212, which is separate from the illumination lens 208.

After partially reflecting the light signal, then at block 508 the optical tracking system 200 directs the reflected light signal through the converging lens 212 towards an optical feedback device 214. At block 510, the optical tracking system 200 detects an intensity of the partially reflected light. In one embodiment, a photodiode 412 converts the partially reflected light to a photocurrent indicative of a beam power of the partially reflected light.

After converting the photocurrent from an analog current signal to a digital current signal, then at block 512 the optical tracking system 200 correlates an intensity of the partially reflected light with an output intensity of the light emitted from the light source 206. In one embodiment, a correlation table 420 stores a list to correlate a detected intensity of the partially reflected light with the intensity of the light emitted from the light source 206.

At block 514, the optical tracking system 200 determines if the output intensity of the light emitted from the light source 206 exceeds a threshold corresponding to an eye-safety level. In one embodiment, an analog-to-digital converter (ADC) 414 converts the photocurrent from an analog signal to a digital signal and then passes the digital signal to the current control logic 416. In this embodiment, the current control logic 416 then analyzes the converted photocurrent signal to determine whether the beam power exceeds a threshold corresponding to an eye-safety level of the light signal emitted from the light source 206.

If the beam power does not exceed the threshold, the light source 206 continues to emit the light of an output intensity presently emitted. Alternatively, in some embodiments the intensity of the light emitted from the light source 206 may be increased, as explained above. Otherwise, at block 516 the optical tracking system 200 adjusts the output intensity of the light source 206 based on the correlation of the intensity of the partially reflected light with the output intensity of the light emitted from the light source 206. In one embodiment, a digital signal processor 410 generates a feedback signal (e.g., a programming current) in response to the output intensity of the light emitted from the light source 206 exceeding the threshold and sends the feedback signal to the programmable laser driver 216. The programmable laser driver 216 then converts the programming current from a digital programming current to an analog programming current and drives the light source 206 with the new analog programming current. Hence, the output intensity of the light is adjusted below the eye-safety level threshold.

Figure 6:
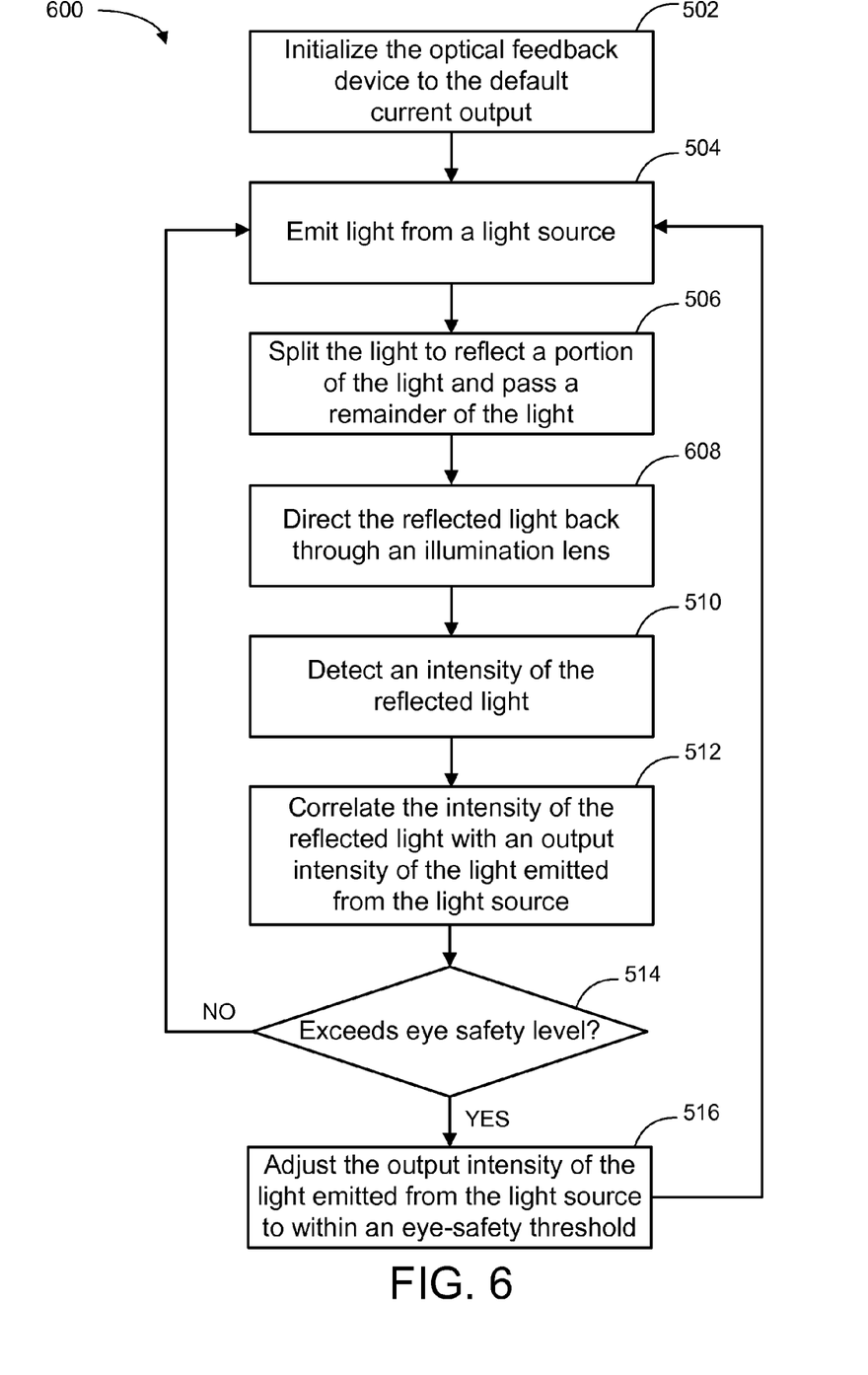
FIG. 6 depicts a schematic flow chart diagram of another embodiment of a self-calibrating optical feedback method for an optical tracking system.

FIG. 6 depicts a schematic flow chart diagram of another embodiment of a self-calibrating optical feedback method 600 for an optical tracking system 300. Although the self-calibrating optical feedback method 600 is described in conjunction with the optical tracking system 300 of FIG. 3, some embodiments of the method 600 may be implemented with other types of optical tracking devices. Additionally, many of the operations of the illustrated self-calibrating optical feedback method 600 are substantially similar to the operations of the self-calibrating optical feedback method 500 of FIG. 5 and, hence, are not described further.

After the beam splitter 210 splits the light to generate the partially reflected light, then at block 608 the optical tracking system 300 directs the reflected light signal back through the illumination lens 208 towards the optical feedback device 214. Subsequently, the optical tracking system 300 proceeds to detects an intensity of the partially reflected light and operate as described above with respect to controlling the intensity of the light emitted from the light source 206.

Embodiments of the self-calibrating optical feedback system and method described can have a real and positive impact on maintaining the output intensity of a laser driven optical navigation device within an eye-safety level. Additionally, some embodiment facilitate maintaining an optimal tracking sensitivity. Also, at least some embodiments are implemented within a conventional size of a laser driven optical navigation device. In addition to maintaining the present device size, embodiments are implemented with merely the addition of a thin reflective plate and light conversion circuitry. A separate collector is not necessary. Also, embodiments substantially prevent stray light from being incident on the light conversion circuitry.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A self-calibrating optical feedback system for an optical navigation device, the self-calibrating optical feedback system comprising:
    a light source to emit light;
    an illumination lens coupled relative to the light source, the illumination lens to direct the light towards a tracking surface;
    a beam splitter interposed between the illumination lens and the tracking surface, the beam splitter to partially reflect the light away from the tracking surface; and
    an optical feedback device to detect the partially reflected light from the beam splitter and to generate a feedback signal to modify an intensity of the light emitted from the light source.

2. The self-calibrating optical feedback system of claim 1, wherein the beam splitter is oriented parallel to the tracking surface and coupled relative to the illumination lens, the beam splitter to direct the partially reflected light towards the optical feedback device, the system further comprising:
    a converging lens interposed between the beam splitter and the optical feedback device, the converging lens to receive the partially reflected light from the beam splitter and to direct the partially reflected light towards the optical feedback device.

3. The self-calibrating optical feedback system of claim 1, wherein:
    the beam splitter is oriented at a non-zero angle relative to the tracking surface and coupled relative to the illumination lens, the beam splitter to reflect the partially reflected light back towards the illumination lens, wherein the illumination lens is further configured to direct the light from the light source towards the beam splitter, and to direct the partially reflected light from the beam splitter towards the optical feedback device.

4. The self-calibrating optical feedback system of claim 1, wherein the optical feedback device comprises:
    a microcontroller to control a self-calibrating optical feedback process;
    an optical feedback circuit to collect and to process the partially reflected light; and
    a storage device coupled to the microcontroller, the storage device comprising:
        firmware to perform operations of the self-calibrating optical feedback process; and
        a correlation table to store a list to correlate a detected intensity of the partially reflected light with the intensity of the light emitted from the light source.

5. The self-calibrating optical feedback system of claim 4, wherein the optical feedback circuit comprises:
    a digital signal processor coupled to the microcontroller, the digital signal processor to process a digital electrical signal representative of the partially reflected light and to generate the feedback signal in response to a beam power of the partially reflected light exceeding a threshold corresponding to an eye-safety level of the light emitted from the light source, wherein the feedback signal comprises a programming current; and
    a reflected light acquisition engine coupled to the digital signal processor, the reflected light acquisition engine comprising:
        a photodiode to receive the partially reflected light and to convert the partially reflected light to a photocurrent;
        an analog-to-digital converter coupled to the photodiode, the analog-to-digital converter to receive the photocurrent from the photodiode and to convert the photocurrent to the digital electrical signal; and
        current control logic coupled to the analog-to-digital converter, the current control logic to measure the converted photocurrent, to calculate the beam power based on the converted photocurrent, and to determine whether the beam power exceeds the threshold.

6. The self-calibrating optical feedback system of claim 1, further comprising a programmable current driver coupled to the optical feedback device and the light source, the programmable current driver to convert a programming current from a digital programming current to an analog programming current, and to drive the light source with the analog programming current.

7. The self-calibrating optical feedback system of claim 1, wherein the light source comprises a coherent light source.

8. The self-calibrating optical feedback system of claim 1, further comprising:
   a sensor array to detect a reflected tracking light reflected from the tracking surface; and
   an imaging lens interposed between the sensor array and the tracking surface, the imaging lens to direct the reflected tracking light from the tracking surface towards the sensor array.

9. A self-calibrating optical feedback method for operating a self-calibrating optical feedback system, the method comprising:
   emitting light from a light source;
   splitting the light from the light source to reflect a portion of the light away from a tracking surface and to pass a remainder of the light towards the tracking surface;
   detecting the light reflected away from the tracking surface; and
   adjusting an output intensity of the light source based on the detected light.

10. The self-calibrating optical feedback method of claim 9, further comprising directing the reflected light towards a photodiode through a converging lens separate from an illumination lens, wherein the illumination lens directs the emitted light from the light source towards the tracking surface.

11. The self-calibrating optical feedback method of claim 9, further comprising directing the reflected light back towards a photodiode through an illumination lens, wherein the illumination lens also directs the emitted light from the light source toward the tracking surface.

12. The self-calibrating optical feedback method of claim 9, further comprising:
   directing the reflected light towards a photodiode;
   receiving the reflected light at the photodiode;
   converting the reflected light to a photocurrent; and
   measuring the photocurrent to determine an intensity of the emitted light from the light source.

13. The self-calibrating optical feedback method of claim 9, further comprising correlating a detected intensity of the reflected light with the output intensity of the light emitted from the light source.

14. The self-calibrating optical feedback method of claim 13, further comprising controlling the output intensity of the light from the light source below an eye-safety level.

15. The self-calibrating optical feedback method of claim 9, wherein emitting the light from the light source comprises emitting a coherent light from the light source.

16. The self-calibrating optical feedback method of claim 9, further comprising:
   controlling a self-calibrating optical feedback process with a microcontroller;
   collecting and processing the reflected portion of the light with an optical feedback circuit;
   performing operations of the self-calibrating optical feedback process with firmware inside a storage device; and
   storing a correlation table inside the storage device, the correlation table to correlate a detected intensity of the detected light with an intensity of the light emitted from the light source.

17. An apparatus, comprising:
   means for emitting coherent light;
   means for splitting the coherent light to produce a reflected beam and tracking beam, wherein the reflected beam is reflected away from a tracking surface and the tracking beam is directed toward the tracking surface;
   means for detecting an intensity of the reflected beam; and
   means for controlling an intensity of the coherent light below an eye-safety level based on the detected intensity of the reflected beam.

18. The apparatus of claim 17, further comprising means for directing the reflected beam towards a converging lens separate from an illumination lens, wherein the illumination lens directs the coherent light towards a beam splitter.

19. The apparatus of claim 17, further comprising means for directing the reflected beam back towards an illumination lens, wherein the illumination lens also directs the coherent light towards a beam splitter.

20. The apparatus of claim 17, further comprising:
   a microcontroller to control a self-calibrating optical feedback process;
   an optical feedback circuit to collect and to process the reflected beam; and
   a storage device coupled to the microcontroller, the storage device comprising:
      firmware to perform operations of the self-calibrating optical feedback process; and
      a correlation table to store a list to correlate the detected intensity of the reflected beam with the intensity of the coherent light emitted from the light source.

* * * * *